(12) United States Patent
Lai et al.

(10) Patent No.: US 12,022,178 B2
(45) Date of Patent: Jun. 25, 2024

(54) COVER OF OPTICAL ENGINE WITH GUIDING STRUCTURE

(71) Applicant: PIXART IMAGING INC., Hsin-Chu County (TW)

(72) Inventors: Hung-Yu Lai, Hsin-Chu County (TW); Yen-Hung Wang, Hsin-Chu County (TW); Wen-Yen Su, Hsin-Chu County (TW); Hui-Hsuan Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/336,349

(22) Filed: Jun. 16, 2023

(65) Prior Publication Data

US 2023/0328349 A1      Oct. 12, 2023

Related U.S. Application Data

(63) Continuation-in-part of application No. 17/841,582, filed on Jun. 15, 2022, which is a continuation-in-part of application No. 17/375,035, filed on Jul. 14, 2021, now Pat. No. 11,595,554, which is a continuation of application No. 16/547,568, filed on Aug. 22, 2019, now Pat. No. 11,095,799, application No. 18/336,349 is a continuation-in-part of application No. 18/098,663, filed on Jan. 18, 2023, now Pat. No. 11,812,130, which is a continuation of application No. 17/375,035, filed on Jul. 14, 2021, now Pat. No. 11,595,554.

(Continued)

(51) Int. Cl.
*G06F 3/0354* (2013.01)
*G05D 1/00* (2006.01)
*G06F 3/03* (2006.01)
*H04N 23/54* (2023.01)
*H04N 23/55* (2023.01)
*H04N 23/56* (2023.01)

(52) U.S. Cl.
CPC ........... *H04N 23/54* (2023.01); *G05D 1/0246* (2013.01); *G06F 3/0317* (2013.01); *G06F 3/03543* (2013.01); *H04N 23/55* (2023.01); *H04N 23/56* (2023.01)

(58) Field of Classification Search
CPC .......................... G06F 3/0317; G06F 3/03543
USPC ....................................................... 345/166
See application file for complete search history.

(56) References Cited

U.S. PATENT DOCUMENTS

2003/0201976 A1* 10/2003 Huang ................ G06F 3/03543
                                                345/163
2007/0236455 A1    10/2007 Cheah et al.
(Continued)

*Primary Examiner* — Thanh Luu
(74) *Attorney, Agent, or Firm* — HAUPTMAN HAM, LLP

(57) ABSTRACT

There is provided a bottom cover for being covered on an optical system. The bottom cover is attached in front of the optical engine. The bottom cover has a bottom surface for facing a working surface when the optical system is moving on the working surface, a first opening for emission light of the optical engine to go through and a second opening for reflected light from the working surface to go through. The bottom cover is further formed with guiding protrusions protruded out from the bottom surface toward the working surface and surrounding at least the second opening to guide soft materials on the working surface to away from the second opening.

19 Claims, 12 Drawing Sheets

Related U.S. Application Data

(60) Provisional application No. 63/235,823, filed on Aug. 23, 2021, provisional application No. 62/756,110, filed on Nov. 6, 2018.

(56) References Cited

U.S. PATENT DOCUMENTS

| | | | |
|---|---|---|---|
| 2009/0256804 A1* | 10/2009 | Liu | G06F 3/0317 |
| | | | 345/166 |
| 2013/0020315 A1* | 1/2013 | Tatsumu | H05B 6/6411 |
| | | | 219/725 |
| 2016/0209935 A1 | 7/2016 | Lee | |
| 2018/0292776 A1 | 10/2018 | Ino et al. | |
| 2019/0343019 A1* | 11/2019 | Todorovic | H05K 7/20927 |

* cited by examiner

COVER OF OPTICAL ENGINE WITH GUIDING STRUCTURE

CROSS-REFERENCE TO RELATED APPLICATIONS

The present application is a continuation-in-part application of U.S. application Ser. No. 17/841,582, filed on Jun. 15, 2022, which claims the priority benefit of U.S. Provisional Application Ser. No. U.S. 63/235,823, filed on Aug. 23, 2021 and is also a continuation-in-part application of U.S. application Ser. No. 17/375,035, filed on Jul. 14, 2021, which is a continuation application of U.S. application Ser. No. 16/547,568, filed on Aug. 22, 2019, which claims the priority benefit of U.S. Provisional Application Ser. No. 62/756,110, filed Nov. 6, 2018, the disclosures of which are hereby incorporated by reference herein in their entirety.

The present application is also a continuation-in-part application of U.S. application Ser. No. 18/098,663, filed on Jan. 18, 2023, which is a continuation application of U.S. application Ser. No. 17/375,035, filed on Jul. 14, 2021, which is a continuation application of U.S. application Ser. No. 16/547,568, filed on Aug. 22, 2019, which claims the priority benefit of U.S. Provisional Application Ser. No. 62/756,110, filed Nov. 6, 2018, the full disclosures of which are hereby incorporated by reference herein in their entirety.

FIELD OF THE DISCLOSURE

This disclosure generally relates to an optical engine having multiple light sources and, more particularly, to an optical engine having multiple light sources adapted to navigation devices and capable of solving the problem of interference between the multiple light sources, and a carrier member of the optical engine.

BACKGROUND OF THE DISCLOSURE

The optical navigation device uses a light source to illuminate a working surface and uses an image sensor to capture reflected light from the working surface to generate image frames. A processor calculates a moving distance and/or speed of the navigation device with respect to the working surface according to the image frames.

However, different working surfaces generally have different reflectivity that causes image features contained in the image frames to have apparent variations. Accordingly, a navigation device capable of distinguishing working surfaces of different materials is required.

Furthermore, a lens system of an optical navigation device is generally set to zoom light reflected at a predetermined distance to obtain the best magnifying effect. If a working surface has soft materials thereon, e.g., a carpet with long hairs or grass, a light reflecting surface on the working surface can be unstable when said soft materials enter a detection zone of an image sensor. In this scenario, the magnification of the lens system becomes unstable due to an object distance of the lens system being changed frequently to degrade the detecting performance of the navigation device.

SUMMARY

Accordingly, the present disclosure provides a bottom cover arranged in front of an optical engine with a guiding structure surrounding a light passing opening to prevent soft materials from entering the light passing opening to fluctuate an object distance of the lens system such that the detection accuracy is improved.

The present disclosure provides a cover for being covered on an optical system, and including a first surface, a first opening, a second opening and two first guiding protrusions. The first surface is configured to face a working surface when the optical system is moving on the working surface. The first opening is configured to let emission light go through. The second opening is arranged adjacent to the first opening in a first direction, and is configured to let reflected light from the working surface go through. The two first guiding protrusions are protruded out from the first surface toward the working surface and respectively arranged at two opposite sides of the second opening in a second direction, wherein each of the two first guiding protrusions has a first branch extending toward the first opening and a second branch extending away from the first opening, and a distance between the first branch and the second branch becomes larger from a connection point of the first branch and the second branch.

The present disclosure further provides a cover for being covered on an optical system, and including a first surface, a first opening, a second opening and two first guiding protrusions. The first surface is configured to face a working surface when the optical system is moving on the working surface. The first opening is configured to let emission light go through. The second opening is arranged adjacent to the first opening in a first direction, and is configured to let reflected light from the working surface go through. The two first guiding protrusions are protruded out from the first surface toward the working surface and respectively arranged at two opposite sides of the second opening in a second direction, wherein each of the two first guiding protrusions has a V-shape with an open end facing the second opening.

The present disclosure provides a cover for being covered on an optical system, and including a first surface, a first opening, a second opening and two first guiding protrusions. The first surface is configured to face a working surface when the optical system is moving on the working surface. The first opening is configured to let emission light go through. The second opening is arranged adjacent to the first opening in a first direction, and is configured to let reflected light from the working surface go through. The two first guiding protrusions are protruded out from the first surface toward the working surface and respectively arranged at two opposite sides of the second opening in a second direction, wherein each of the two first guiding protrusions has an arc shape with an open end facing the second opening.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

The present disclosure provides an optical engine having multiple light sources. The optical engine has a barrier structure for protecting the elements therein and preventing the interference between emission light of different light sources and reflected light from a working surface to improve the identification accuracy. The optical engine is adapted to, for example, a navigation device operating on the working surface, e.g., a cleaning robot, but not limited thereto.

Figure 1:
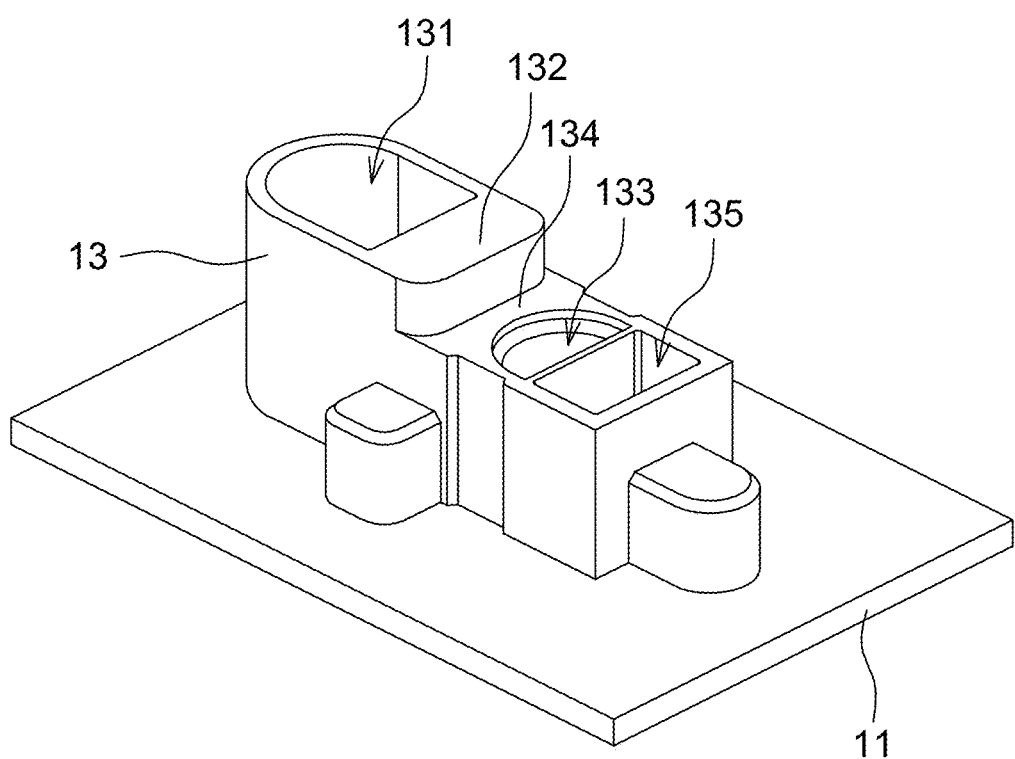
FIG. 1 is a solid diagram of an optical engine according to one embodiment of the present disclosure.
Figure 2:
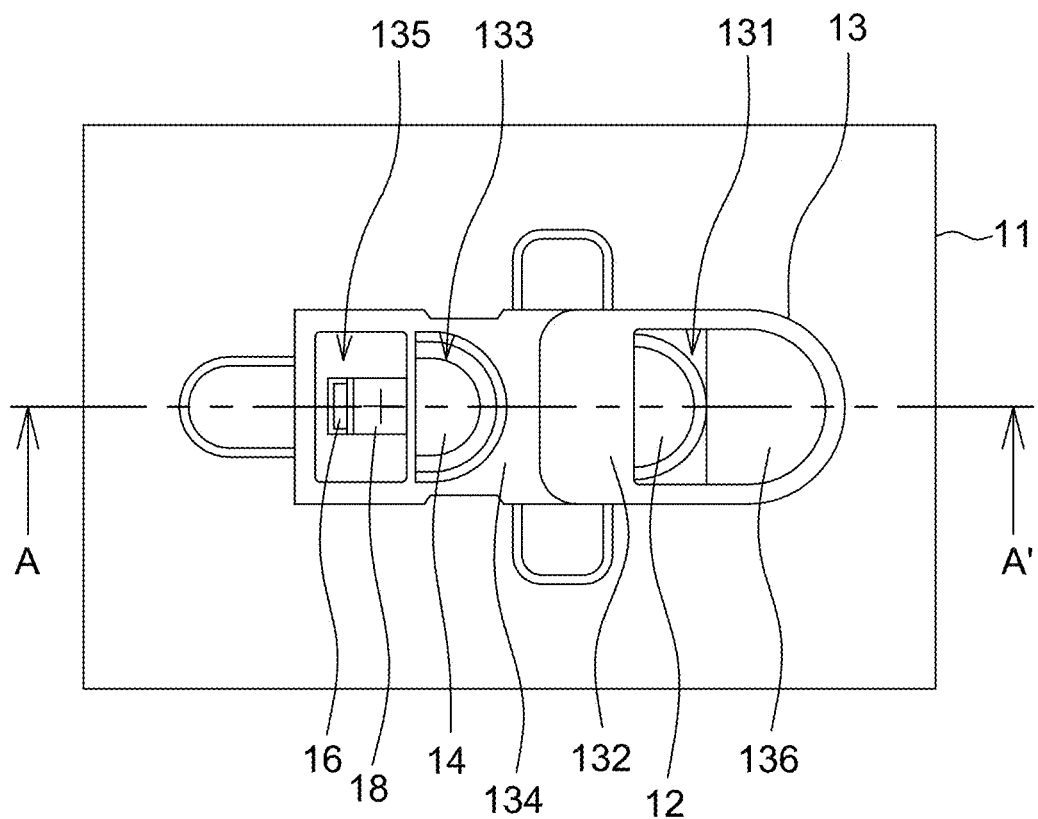
FIG. 2 is an upper view of an optical engine according to one embodiment of the present disclosure.
Figure 3:
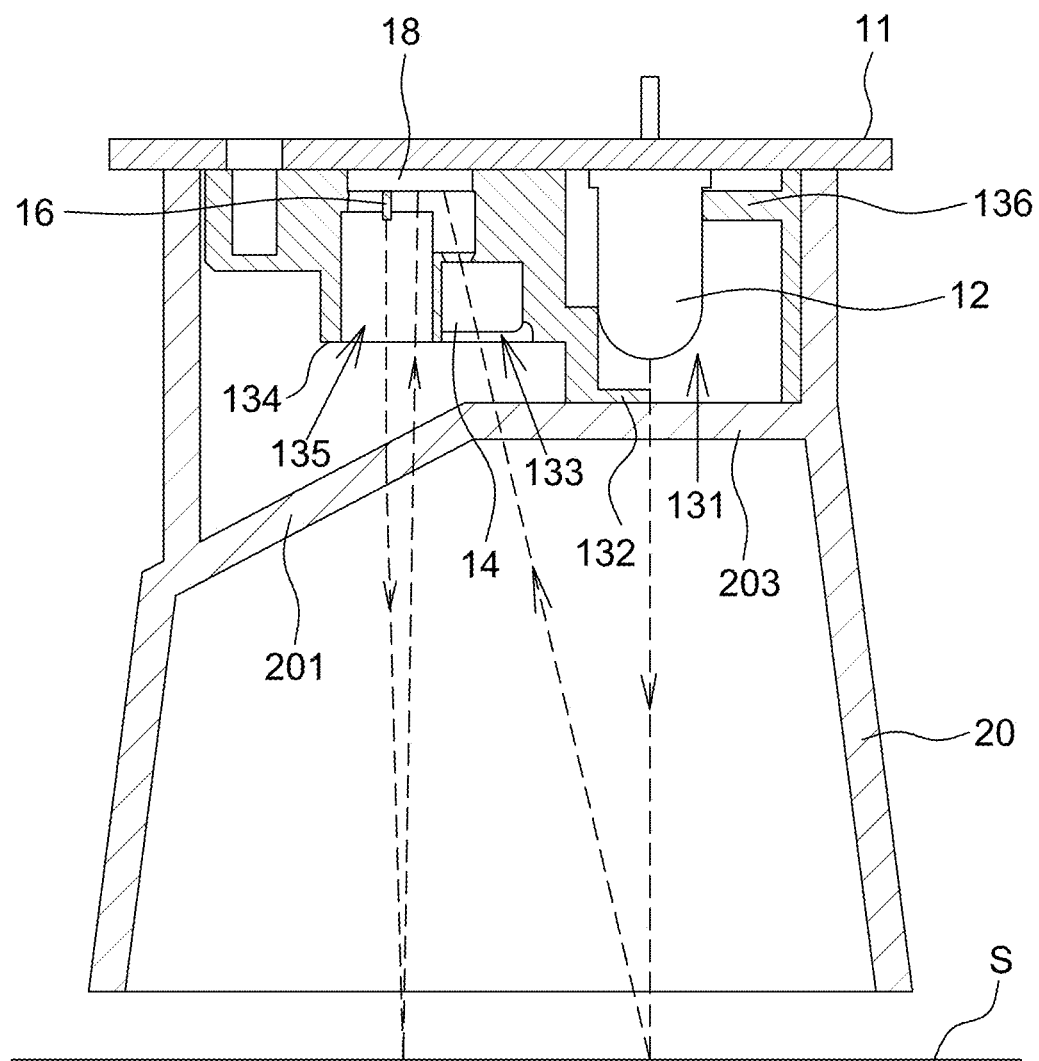
FIG. 3 is a cross-sectional view of the optical engine and a hood alone line A-A' in FIG. 2.

Referring to FIGS. 1 to 3, FIG. 1 is a solid diagram of an optical engine 100 according to one embodiment of the present disclosure; FIG. 2 is an upper view of an optical engine 100 according to one embodiment of the present disclosure; and FIG. 3 is a cross-sectional view of the optical engine 100 alone line A-A' in FIG. 2 and a hood 20.

Figure 6:
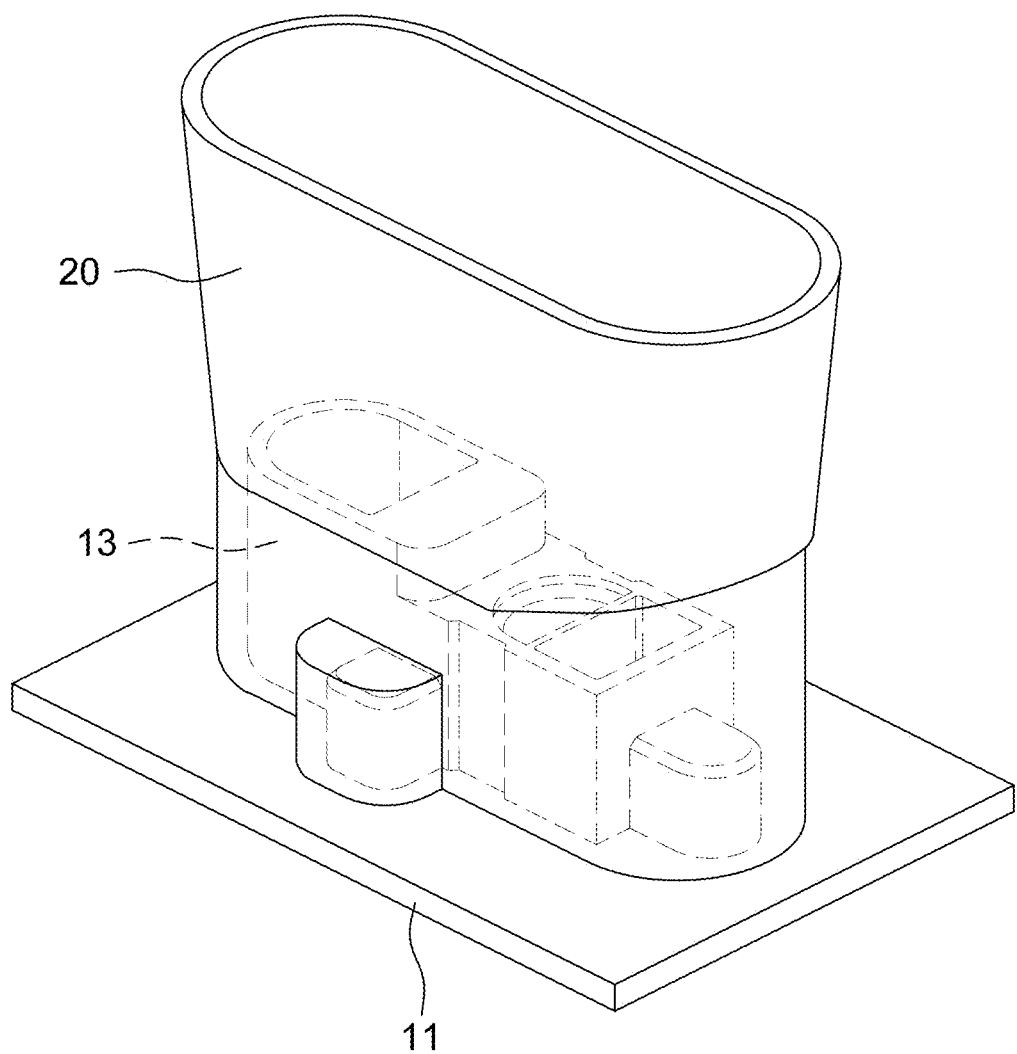
FIG. 6 is another solid diagram of an optical engine according to one embodiment of the present disclosure.

The optical engine 100 includes a first light source 12, a lens 14, a second light source 16, an image sensor 18, a substrate 11 and a barrier structure 13 disposed on the substrate 11, wherein the barrier structure 13 is attached to the substrate 11 via glue or screwing member without particular limitations. The substrate 11 is a printed circuit board (PCB) or a flexible substrate without particular limitations. In some embodiments, the optical engine 100 further includes a hood 20 (further referring to FIG. 6) arranged on the substrate 11 and covering the barrier structure 13 for dust protection and blocking ambient light. The hood 20 is attached to the substrate 11 via glue or screwing member without particular limitations.

The barrier structure 13 is preferably not transparent to the light emitted by the first light source 12 and the second light source 16. The material of the barrier structure 13 is not particularly limited, such as plastic, and is manufactured by, for example, injection molding. The barrier structure 13 has a first plane surface 132 and a second plane surface 134 parallel to the substrate 11. In one aspect, the first plane surface 132 is higher than the second plane surface 134. The first plane surface 132 has a first opening 131 to have a first space therebelow. The second plane surface 134 has a second opening 133 and a third opening 135 adjacent to each other to respectively have a second space and a third space therebelow. Said openings and spaces are used as the tunnel for light beams propagating in and out the barrier structure 13.

The first light source 12 is arranged inside the first opening 131 (i.e. in the first space) and electrically coupled to the substrate 11 to receive control signals and power therefrom. The first light source 12 is described herein using a light emitting diode as an example (e.g., infrared light emitting diode, but not limited to). The first light source 12 is used to generate emission light leaving the first opening 131 in a direction substantially perpendicular to the substrate 11 to illuminate the working surface S. For fixing the first light source 12, in some aspects the barrier structure 13 further includes a protrusion structure 136 pressing against the first light source 12. It should be mentioned that although FIG. 3 shows that the protrusion structure 136 perpendicularly extends from the barrier structure 13 in a transverse direction, it is only intended to illustrate but not to limit the present disclosure. In other aspects, the protrusion structure 136 extends from the barrier structure 13 with a tilt angle (e.g., upward or downward) to press against a surface of the first light source 12. In other aspects, the side wall surrounding the first opening 131 (or the first space) of the barrier structure 13 is manufactured to have a larger thickness to directly attach to the side of the first light source 12 to fix the first light source 12 therein without forming the transverse protrusion structure 136, i.e. the first light source 12 just fitting the first space.

The lens 14 is arranged inside the second opening 133 (or the second space) to guide reflected light from the working surface S and associated with the first light source 12 to the image sensor 18. In some aspects, in order to be able to arrange the lens 14 into the second opening 133, the lens 14 is cut to reshape the appearance thereof (e.g., having non-circular cross-section). It should be mentioned that although FIG. 3 shows that a single lens 14 is arranged inside the second opening 133, the present disclosure is not limited thereto. Corresponding to different applications, a lens set having more than one lens is arranged in the second opening 133, and the barrier structure 13 is formed with a structure to carry said lens set.

The second light source 16 is arranged inside the third opening 135 (i.e. in the third space) and electrically coupled to the substrate 11 to receive control signals and power therefrom. The second light source 16 is described herein using a laser diode as an example (e.g., infrared laser diode, but not limited to). The second light source 16 is used to generate emission light leaving the barrier structure 13 via the third opening 135 to illuminate the working surface S. In one aspect, the second light source 16 and the first light source 12 respectively illuminate different areas on the working surface S. In one aspect, there is no any optical component arranged inside the third opening 135 to expand or shrink emission light generated by the second light source 16.

The image sensor 18 is arranged under the third opening 135 (i.e. in the third space) and electrically coupled to the substrate 11 to receive/send signals therethrough. The image sensor 18 is a CMOS image sensor, a CCD image sensor or the like. In one aspect, the second light source 16 and the image sensor 18 are encapsulated in a same chip package, which is disposed on the substrate 11 and electrically connected thereto. In this case, a blocking layer is preferably formed between the second light source 16 and the image sensor 18 to prevent the emission light from the second light source 16 from directly being received by the image sensor 18. In other aspects, said chip package further has a processor, e.g., an application specific integrated circuit (ASIC) or a digital signal processor (DSP), to process image signals acquired by the image sensor 18.

Figure 4:
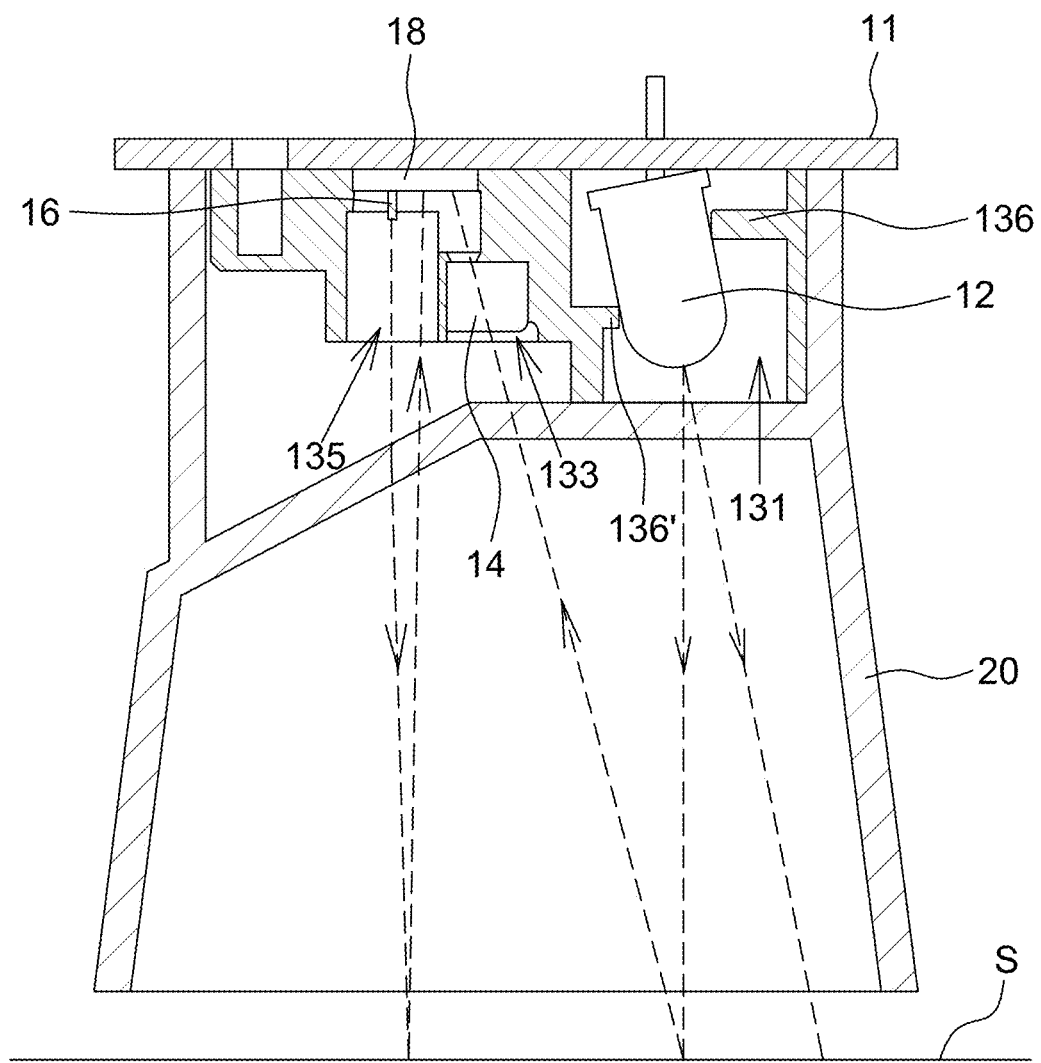
FIG. 4 is a cross-sectional view of an optical engine according to another embodiment of the present disclosure.
Figure 5:
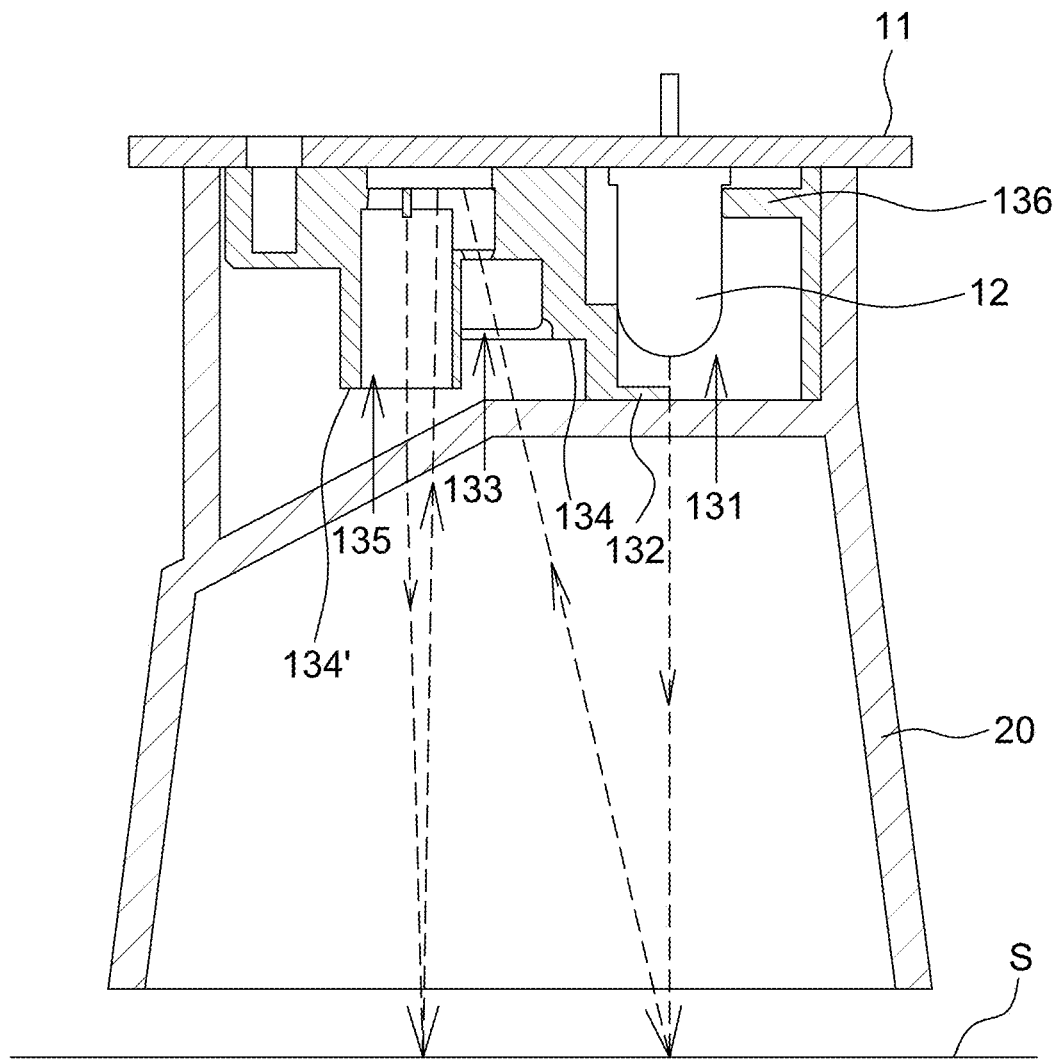
FIG. 5 is a cross-sectional view of an optical engine according to an alternative embodiment of the present disclosure.

The image sensor 18 has a sensing surface (e.g., the bottom surface in the FIGS. 3 to 5). A part of the sensing surface overlaps the third opening 135 and another part of the sensing surface overlaps the second opening 133 and the lens 14. In this way, a part of the sensing surface of the image sensor 18 receives reflected light that enters the barrier structure 13 via the third opening 135, wherein the reflected light is formed after being emitted by the second light source 16 and then reflected by the working surface S. Another part of the sensing surface of the image sensor 18 receives reflected light via the lens 14 in the second opening 133, wherein the reflected light is formed after being emitted by the first light source 12 and then reflected by the working surface S.

In this embodiment, to prevent the reflected light associated with the first light source 12 from being received by the image sensor 18 via the third opening 135, the first plane surface 132 blocks a part of the first light source 12 (e.g., FIGS. 2 and 3 showing a half being blocked and the other half being exposed) to block reflected light of the emission light generated by the first light source 12 from entering the third opening 135. The area being blocked is determined according to a transverse distance between the first light source 12 and the image sensor 18 as well as a vertical distance between the first light source 12 and the working surface S. The inner surface of the first plane surface 132 is directly attached to the top of the first light source 12 or separated from the first light source 12.

In this embodiment, different areas of the image frame captured by the image sensor 18 is used by a processor (included in the chip package or coupled to the image sensor 18 via the substrate 11) to calculate the detection result of different light sources. Other arrangements are used in the present disclosure to avoid the interference between light from different light sources.

Referring to FIG. 4, it is a cross-sectional view of an optical engine and a hood 20 according to another embodiment of the present disclosure. In this embodiment, the first plane surface 132 does not cover upon the first light source 12. By arranging the first light source 12 to generate emission light leaving the first opening 131 in a direction tilted away from the lens 14 (e.g., FIG. 4 showing toward a lower-right direction), reflected light of the emission light generated by the first light source 12 only reaches the second opening 133 without entering the third opening 135.

The difference between this embodiment and that of FIG. 3 is that the first light source 12 is arranged with a tilted angle (i.e. an emission axis thereof not perpendicular to the substrate 11) to realize the objective of eliminating the interference. The arrangement of other components is identical to FIG. 3, and thus details thereof are not repeated herein.

In this embodiment, as the first light source 12 is arranged with a tilt angle, at least one protrusion structure (e.g., two protrusion structures 136 and 136' being shown herein, but not limited to) is selected to form inside the first opening 131 to press again and fix the first light source 12. In other aspects, the size of the first opening 131 (or first space) is manufactured to fit a size of the first light source 12 such that when the first light source 12 is inserted into the first space, the first light source 12 is fixed and has the predetermined tilt angle.

Referring to FIG. 5, it is a cross-sectional view of an optical engine and a hood 20 according to an alternative embodiment of the present disclosure. In this embodiment, the barrier structure 13 has a first plane surface 132, a second plane surface 134 and a third plane surface 134', wherein the first plane surface 132 has a first opening 131 to have a first space therebelow; the second plane surface 134 has a second opening 133 to have a second space therebelow; and the third plane surface 134' has a third opening 135 to have a third space therebelow, and the second plane surface 134 is lower than the first plane surface 132 and the third plane surface 134'. More specifically, in this embodiment, a height of the side wall of the third opening 135 is increased to prevent reflected light, formed after being emitted by the first light source 12 and reflected by the working surface S, from entering the third opening 135. In one aspect, the first plane surface 132 and the third plane surface 134' have an identical height, but not limited to. The difference between this embodiment and that of FIG. 3 is that the side wall surrounding the third opening 135 (or third space) is increased to be higher than the second plane surface 134. The arrangement of other components is identical to FIG. 3 and thus details thereof are not repeated herein.

The hood 20 preferably has a tilted part 201 and a transverse part 203 therein (as shown in FIG. 3-5) that are transparent to the emission light of the second light source 16 and the first light source 12, respectively, or transparent to the sensing spectrum of the image sensor 18. The tilted part 201 preferably causes the emission light from the second light source 16 to be refracted (e.g., toward lower-right direction in figure) after passing through, and a refracted angle is arranged to cause the reflected light from the working surface S associated with the second light source 16 to propagate to the image sensor 18 via the third opening 135 instead of via the second opening 133. Preferably, the emission light of the first light source 12 is not refracted while passing through the transverse part 203.

In an alternative aspect, the transverse part 203 is arranged in the way to refract the emission light from the first light source 12 to bend toward right side of the figure to have the same effect of FIG. 4. In this way, the first light source 12 is not arranged in a tilt angle to prevent the emission light of the first light source 12 to be reflected to enter the third opening 135.

Although the above embodiments described that the reflected light associated of the first light source 12 does not enter the third opening 135 and the reflected light associated with the second light source 16 does not enter the second opening 133, it is appreciated that this only means most energy of the emission light of the first light source 12 and the second light source 16 does not enter the corresponding opening. As the working surface S has the light scattering effect, a small part of the emission light of the first light source 12 is still scattered to the third opening 135 and a small part of the emission light of the second light source 16 is still scattered to the second opening 133. As the energy of the scattered light is relatively small, detecting efficiency is considered not being affected thereby.

It is appreciated that the shape of every opening in the above embodiments is only intended to illustrate but not to limit the present disclosure.

Figure 7:
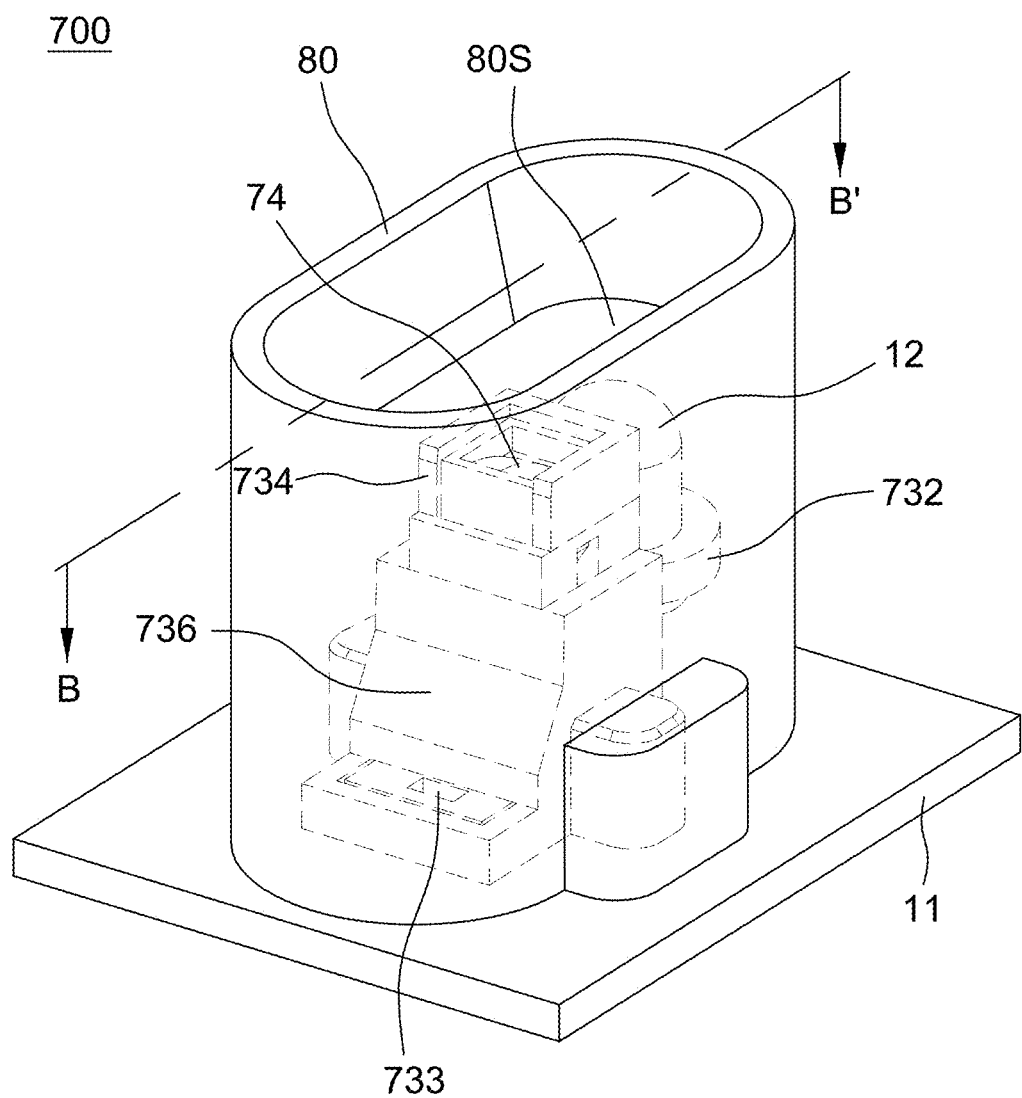
FIG. 7 is a solid diagram of an optical engine and a hood thereof according to a second embodiment of the present disclosure.
Figure 8:
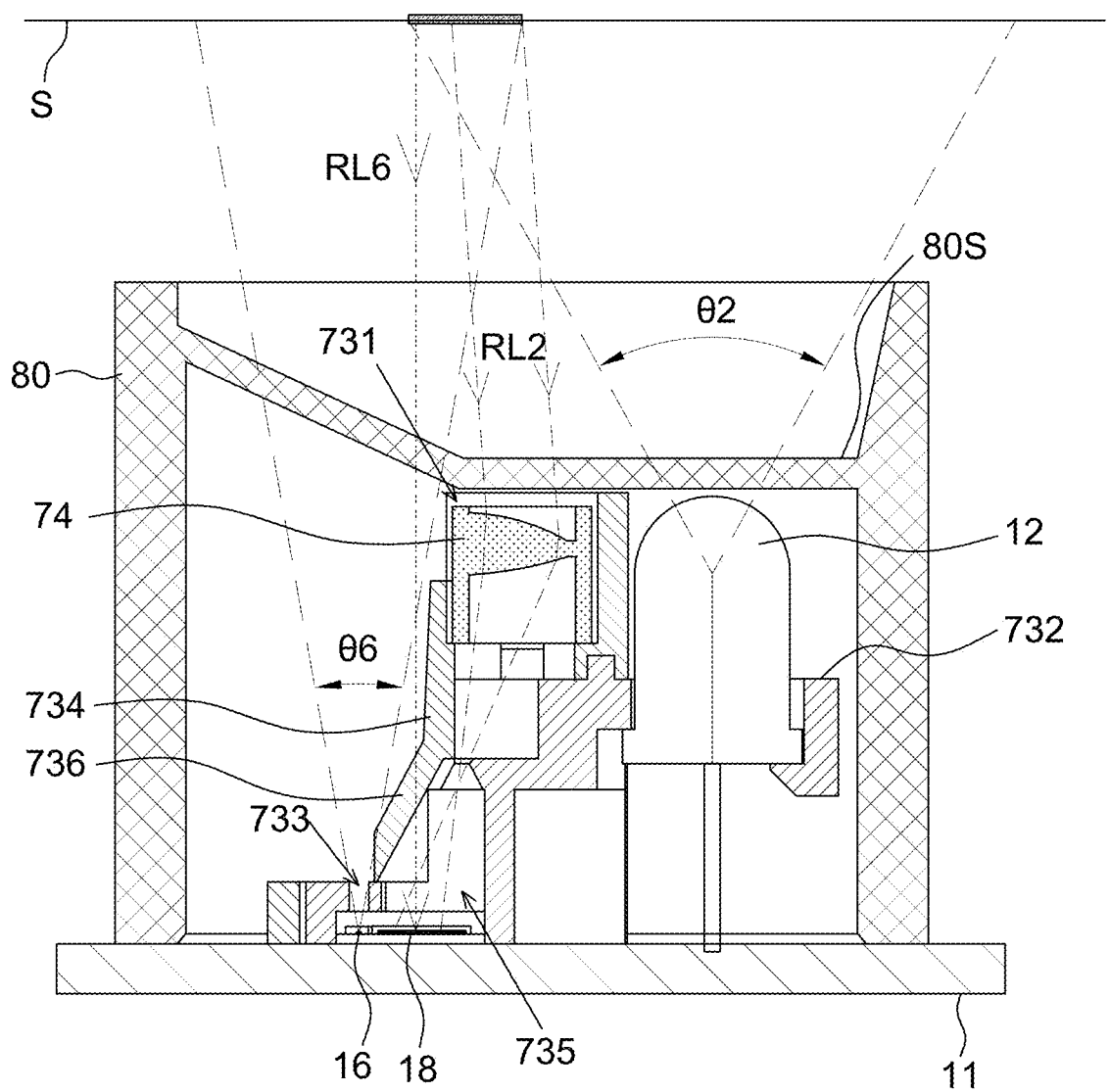
FIG. 8 is a cross-sectional view of the optical engine and the hood thereof alone line B-B' in FIG. 7.
Figure 9:
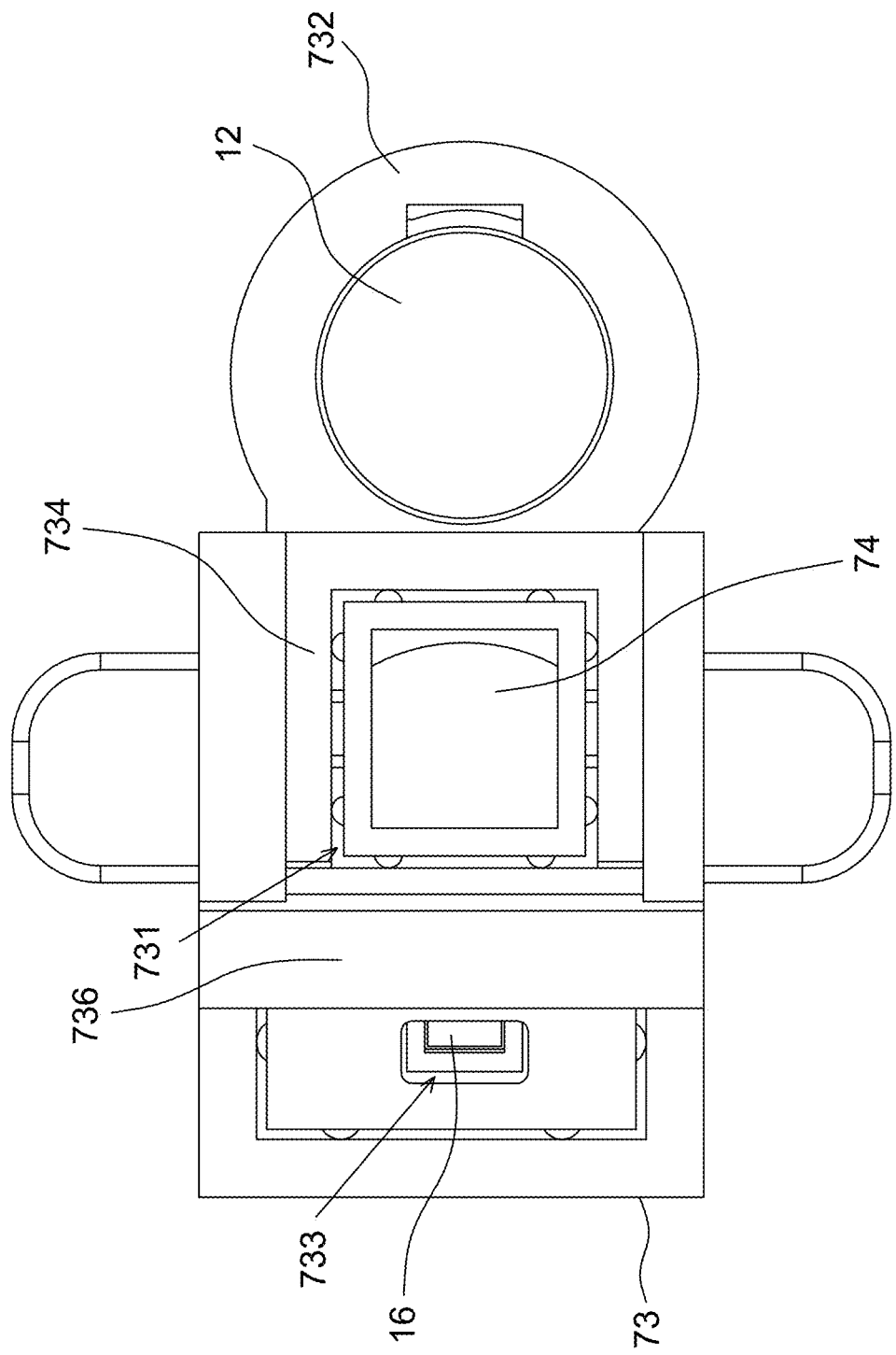
FIG. 9 is an upper view of an optical engine according to a second embodiment of the present disclosure.

Please refer to FIG. 7 to FIG. 9, FIG. 7 is a solid diagram of an optical engine 700 and a hood 80 thereof according to a second embodiment of the present disclosure; FIG. 8 is a cross-sectional view of the optical engine 700 and the hood 80 alone line B-B' in FIG. 7; and FIG. 9 is an upper view of an optical engine according to a second embodiment of the present disclosure.

In the second embodiment, elements identical to those in FIG. 1 to FIG. 3 are indicated by the same numerical references. For example, the substrate 11, the first light source 12, the second light source 16 and the image sensor 18 in the second embodiment are identical to those of the above embodiments, and thus details thereof are not repeated herein. In the second embodiment, the lens 74 is, for example, a condensing lens which is also cut to regulate a shape thereof. The lens 74 is formed by a single lens or a lens set without particular limitations.

In the second embodiment, the first light source 12 is a light emitting diode, is electrically coupled to the substrate 11 and emits light of a first wavelength. The method of electrically coupling the first light source 12 to the substrate 11 is not particularly limited. The second light source 16 is a laser diode, is arranged on the substrate 11 and emits light of a second wavelength. In one aspect, the first wavelength is different from the second wavelength so as to generate different reflecting and scattering effects corresponding to different material of the working surface S. For example, the first wavelength is within a range between 600 nm and 660 nm, and the second wavelength is within a range between 820 nm and 880 nm, but the present disclosure is not limited thereto. The image sensor 18 is also arranged on the substrate 11.

As mentioned above, the second light source 16 and the image sensor 18 are two individual elements (respectively arranged on the substrate 11) or accommodated in the same chip package without particular limitations.

In the second embodiment, the carrier member 73 (or called package structure herein) is formed by, for example, injection molding and then assembled on the substrate 11. For example, FIG. 9 shows that the carrier member 73 has two wings (shown at upper and lower sides) for being secured to the substrate 11 via screwing members (not shown). It is able to assemble the carrier member 73 to the substrate 11 using other method, e.g., using adhesive.

The carrier member 73 includes a light holder 732 (as one aspect of a light containing structure of the carrier member), a lens holder 734 (as one aspect of an optical carrier structure of the carrier member), an accommodation space 735 (as a chip contain space which is located in a chip containing structure of the carrier member) and a tilted wall 736 (also called filter sidewall while having light filtering ability). In one aspect, the lens holder 734 is located between the light holder 732 and the tilted wall 736 in a transverse direction (e.g., left-right direction in FIG. 8), and the lens holder 734 is higher than the light holder 732 and the tilted wall 736 at the longitudinal direction.

In one aspect, the tilted wall 736 is integrated with the lens holder 734 (e.g., the tilted wall 736 being a part of the lens holder 734), and extended downward at an angle in a direction (e.g., shown as left side in FIG. 8) farther away from the light holder 732. Said angle is determined according to a height of the lens holder 734 as well as a transverse distance between the lens holder 734 and a second opening 733, which is at an upper plate above the accommodation space 735 and adjacent to the tilted wall 736.

In one aspect, the light holder 732 and the lens holder 734 are two individual elements (e.g., independently manufactured and having different material), and are combined together (e.g., using latching structure or adhesive with particular limitations) to form an integral whole as a part of the carrier member 73. For example, FIG. 8 shows that the light holder 732 is attached to the lens holder 734 from the lower side of the lens holder 734.

The light holder 732 is used to fix the first light source 12 (e.g., plugged into a holder hole thereof) such that the first light source 12 emits light toward an opposite side of the substrate 11 to illuminate the working surface S. That is, the light holder 732 has a light source contain space for containing the first light source 12. It should be mentioned that although FIG. 8 shows that the first light source 12 is vertically arranged in the light holder 732, the present disclosure is not limited thereto. In another aspect, the first light source 12 is arranged in the light holder 732 with a tilted angle, e.g., inclined toward the lens holder 734.

The lens holder 734 is adjacent to the light holder 732 in a first direction (e.g., left direction in FIG. 8), and has a first opening 731 for arranging and fixing the lens 74 therein. That is, the lens holder 734 has a lens contain space for containing the lens 74.

The accommodation space 735 of the chip containing structure accommodates the second light source 16 and the image sensor 18. Furthermore, the carrier member 73 further has a second opening 733 located on the chip containing structure and connecting to the accommodation space 735 to allow emission light of the second light source 16 to leave the accommodation space 735 via the second opening 733. In the aspect that the carrier member 73 is formed by combining the light holder 732 and the lens holder 734 which are independently manufactured from each other, the accommodating space 735 is inside the lens holder 734 and the second opening 733 is located on the lens holder 734. In one aspect, the second light source 16 is arranged right below the second opening 733.

The tilted wall 736 is adjacent to the lens holder 734 in the first direction, and arranged upon the image sensor 18 that is arranged inside the accommodation space 735. Preferably, the light holder 732 has a through hole between the first opening 731 and the accommodation space 735 to allow reflected light passing the lens 74 to go through to reach the image sensor 18.

In the second embodiment, reflected light (i.e. reflected by the working surface S) associated with the first light source 12 penetrates through the lens 74 to propagate to the image sensor 18. In one aspect, a part of the accommodation space 735 is below the lens holder 734 such that a part of the image sensor 18 in the accommodation space 735 is arranged below the lens 74. Reflected light (i.e. reflected by the working surface S) associated with the second light source 16 penetrates through the tilted wall 736 to propagate to the image sensor 18.

To avoid interference between the two light sources, in one aspect the light holder 732 is made of opaque material. The tilted wall 736 is opaque to emission light of a first wavelength from the first light source 12 but transparent to emission light of a second wavelength from the second light source 16. The lens 74 is opaque to emission light of the second wavelength from the second light source 16 but transparent to emission light of the first wavelength from the first light source 12.

In the aspect that an emission angle θ2 of the first light source 12 is arranged in the way that reflected light of the first wavelength does not propagate to the tilted wall 736, the tilted wall 736 is not arranged to have light filtering ability, i.e. made of transparent material.

In the aspect that the lens holder 734 is integrated with the tilted wall 736, the lens holder 734 is opaque to emission light of the first wavelength from the first light source 12 but transparent to emission light of the second wavelength from the second light source 16.

To allow the image sensor 18 to capture features of the same region at the working surface S, a first illuminated region of the first light source 12 (shown to have an emission angle θ2) on the working surface S, which is at a predetermined distance, is partially overlapped with a second illuminated region of the second light source 16 (shown to have an emission angle θ6) on the working surface, e.g., shown as a region filled with slant lines in FIG. 8.

In the second embodiment, by arranging the lens 74 and the tilted wall 736 to limit light of specific wavelength (e.g., selecting material thereof) to go through, the emission lights from the first light source 12 and the second light source 16 do not interfere to each other such that no light blocking member needs to be arranged in front of the first light source 12 to limit the emission angle θ2 of the first light source 12, and thus the light using efficiency is improved.

In one aspect, the second embodiment also includes a hood 80 arranged on the substrate 11 and covering the carrier member 73 to protect the whole optical engine. The wall of the hood 80, e.g., shown as elliptic cylinder in FIGS. 7, is arranged to be vertical to the substrate 11 to facilitate manufacturing and improve the manufacturing yield. The hood 80 has a separation plate 80S for separating two spaces, wherein one side (e.g., upper side in FIGS. 7 and 8) of the separation plate 80S is opposite to the working surface S during operation, and the other side (e.g., lower side in FIGS. 7 and 8) is opposite to the carrier member 73. In one aspect, the whole of the hood 80 is made of transparent material. In another aspect, only the separation plate 80S of the hood 80 is transparent but the wall of the hood 80 is not transparent, e.g., by coating opaque material on the surface thereof.

It should be mentioned that although the light filtering structure (i.e. filter sidewall 736) for blocking the first wavelength and allowing the second wavelength to go through is illustrated by a tilted wall, the present disclosure is not limited thereto. In other aspects, said light filtering structure is arranged as a horizontal plate above the image sensor 18, e.g., horizontally extending from the lens holder 734 and then vertically extending downward without particular limitations as long as the reflected light associated with the second light source 16 can go through said light filtering structure (e.g., the horizontal plate) before reaching the image sensor 18.

As mentioned above, the first light source 12 and the second light source 16 are arranged to illuminate the working surface S at a predetermined distance, e.g., determined according to an object distance of the lens 74. Therefore, when the working surface S has soft materials thereon, e.g., including long hair carpet or grass, these soft materials will enter an optical path of the optical engine 700 to change an effective distance of the working surface S when the navigation device is moving across the soft materials. Accordingly, the present disclosure further provides a cover 900 to be combined to a hood of the optical engine or a body case of the navigation device.

Figure 10:
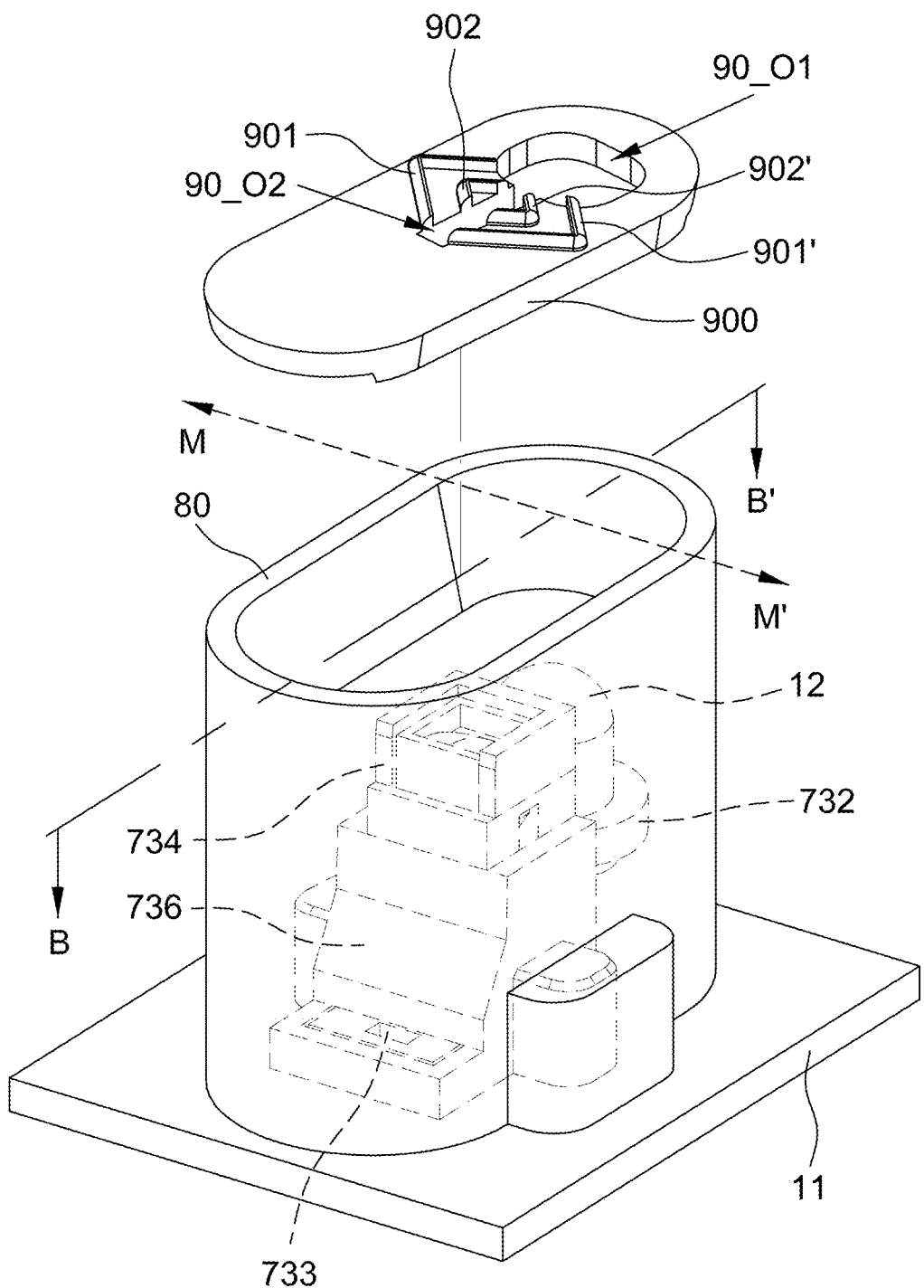
FIG. 10 is a solid diagram of an optical engine and a hood in FIG. 7 with a bottom cover combinable to the hood.

Please refer to FIG. 10, it is a solid diagram of an optical system, e.g., including an optical engine 700 and a hood 80 in FIG. 7 further with a cover 900 combined to the hood 80. In one aspect, the cover 900 has a plate structure and has an outline to be fit in or attached to the hood 80. In another aspect, the cover 900 is a part of a body case (e.g., fit in the body case) of the optical system (e.g., the navigation device mentioned above) as a bottom cover of the optical system, and a shape thereof is not limited to an ellipse as shown in the drawings of the preset disclosure, e.g., the plate structure having a rectangular shape. The optical engine 700 is identical to that described above, and thus details thereof are not repeated herein.

The cover 900 has a first surface (e.g., the upper surface herein), a first opening 90_O1 and a second opening 90_O2 arranged adjacent to the first opening 90_O1 in a first direction. In this embodiment, the optical system is arranged to move in a second direction (e.g., shown as M-M' direction), and the first direction is perpendicular to the second direction.

The first surface of the cover 900 faces the working surface S when the optical system is in operation, i.e. moving on the working surface S.

The first opening 90_O1 is arranged upon (or opposite to) the first light source 12 to allow emission light from the first light source 12 to go through. The size of the first opening 90_O1 is determined, for example, according to an emission angle of the first light source 12.

The second opening 90_O2 is arranged upon (or opposite to) the image sensor 18 to allow reflected light from the working surface S to go through. The size of the second opening 90_O2 is determined according to, for example, a light receiving range of the lens 74. In one aspect, the second opening 90_O2 connects to the first opening 90_O1, and the second opening 90_O2 preferably has a line shape, e.g., longer in the first direction but narrower in the second direction. In the case that the optical engine 700 has a second light source 16, a length of the second opening 90_O2 in the first direction extends to be upon (or opposite to) the second light source 16 to allow emission light from the second light source 16 to go through. Although the second opening 90_O2 is not limited to have the line shape, said line shape also has the function to prevent soft materials from entering the second opening 90_O2 when the soft materials is passing the first surface.

To guide soft materials (if there are) on the working surface S at least to bypass the second opening 90_O2, the cover 900 further includes two first guiding protrusions 901 and 901' protruded out from the first surface toward the working surface S and respectively arranged at two opposite sides of the second opening 90_O2 in the second direction. Each of the two first guiding protrusions 901 and 901' has a first branch (e.g., upper branch in FIG. 10) extending toward the first opening 90_O1 and a second branch (e.g., lower branch in FIG. 10) extending away from the first opening 90_O1, and a distance between the first branch and the second branch becomes larger from a connection point (i.e. turning point) of the first branch and the second branch. When the soft materials come from the second direction (i.e. moving direction of the optical system), the two first guiding protrusions 901 and 901' are able to guide/direct the soft materials toward both sides of the first direction to prevent the soft materials from entering at least the second opening 90_O2. As shown in FIG. 10, one end of the first branches (e.g., upper branch) of the first guiding protrusions 901 and 901' extends to an edge of the first opening.

Figure 11A:
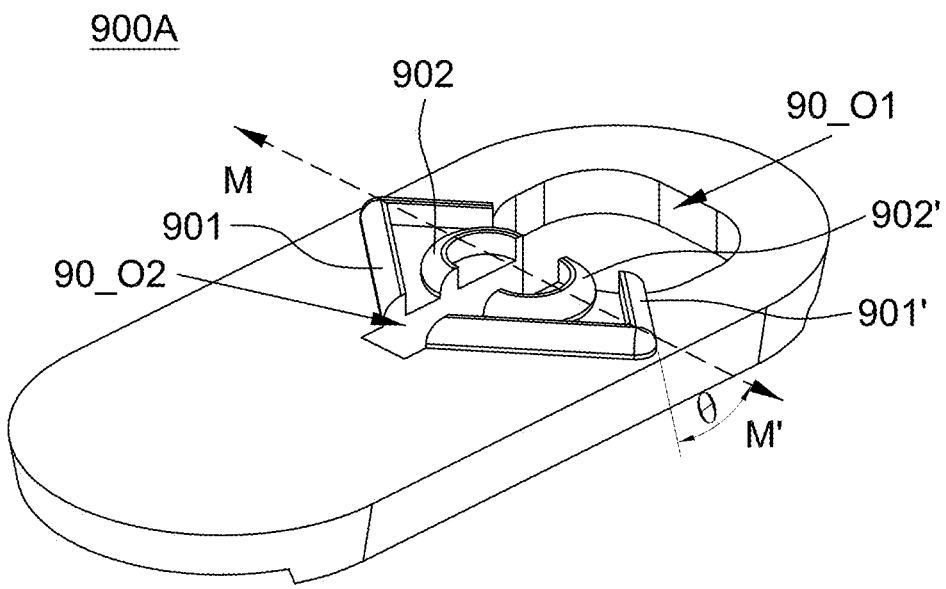
FIGS. 11A to 11D are solid diagrams of different bottom covers according to some embodiments of the present disclosure.
Figure 11B:
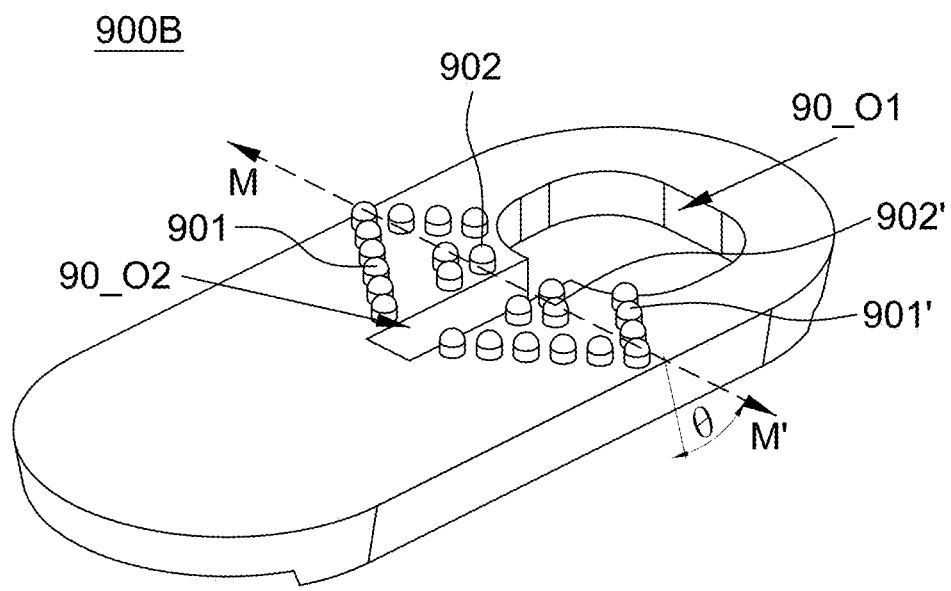

The shape (including an appearance shape and cross-section shape) of the two first guiding protrusions 901 and 901' are not particularly limited. For example, FIGS. 10, 11A and 11D show that the first branch and the second branch are respectively a continuous straight wall, i.e. the two first guiding protrusions 901 and 901' respectively include two continuous straight walls; FIG. 11B shows that the first branch and the second branch respectively include multiple individual pillars, i.e. the two first guiding protrusions 901 and 901' respectively include multiple individual pillars; and FIG. 11C shows that the first branch and the second branch are respectively a continuous curved wall, i.e. the two first guiding protrusions 901 and 901' respectively include a continuous curved wall.

FIGS. 11A to 11D are solid diagrams of different covers 900A to 900D according to some embodiments of the present disclosure.

To further improve the guiding efficiency, the cover 900 further includes two second guiding protrusions 902 and 902', protruded out from the first surface toward the working surface S and respectively arranged at two opposite sides of the second opening 90_O2 in the second direction, wherein the two second guiding protrusions 902 and 902' are closer to the second opening 90_O2 than the two first guiding protrusions 901 and 901'. The two second guiding protrusions 902 and 902' are preferably distanced from the two first guiding protrusions 901 and 901' by a distance that allow at least one carpet hair to be directed by a trench between the first guiding protrusion 901 and the second guiding protrusion 902 as well as between the first guiding protrusion 901' and the second guiding protrusion 902'.

Figure 11C:
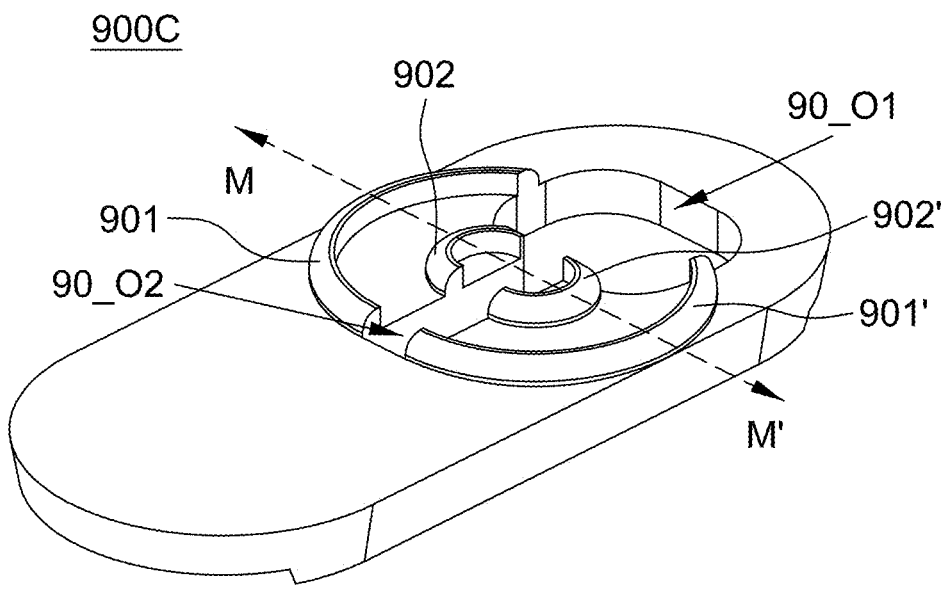
Figure 11D:
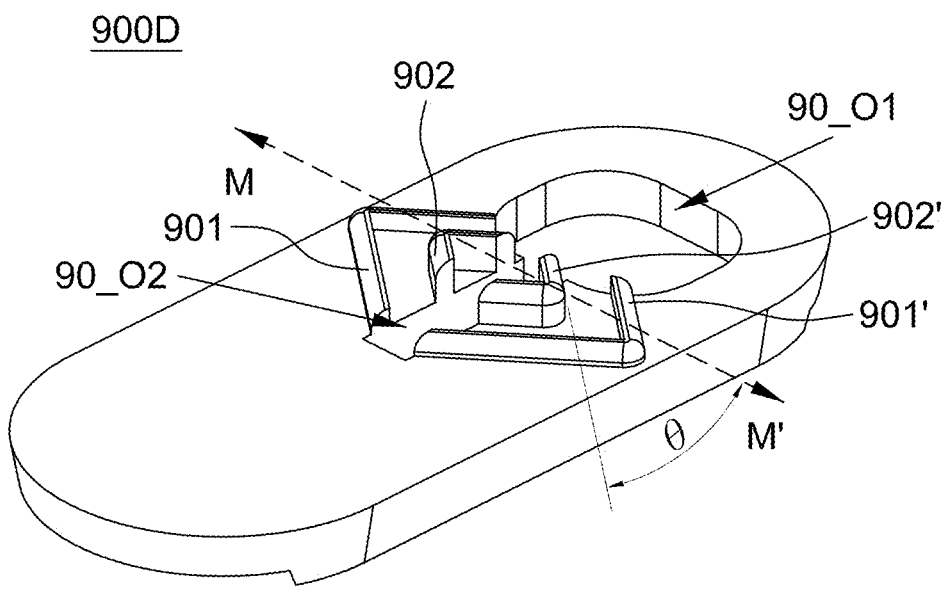

In one aspect, the two second guiding protrusions 902 and 902' have the same shape (including an appearance shape and cross-section shape) as that of the two first guiding protrusions 901 and 901', e.g., as shown in FIGS. 10, 11B and 11C. In a further aspect, the two second guiding protrusions 902 and 902' have a different shape from that of the two first guiding protrusions 901 and 901', e.g., as shown in FIG. 11A. In FIG. 11D, the second guiding protrusions 902 and 902' have a similar shape to the two first guiding protrusions 901 and 901', but have a larger size.

In one aspect, the two second guiding protrusions 902 and 902' have the same height as that of the two first guiding protrusions 901 and 901', e.g., as shown in FIGS. 10, 11A, 11B and 11C. In a further aspect, the two second guiding protrusions 902 and 902' have a different height from that of the two first guiding protrusions 901 and 901', e.g., as shown in FIG. 11D that the two second guiding protrusions 902 and 902' are higher than the two first guiding protrusions 901 and 901'.

In one aspect, the first branch and the second branch of the first guiding protrusions 901 and 901' respectively form a V-shape such that each of the two first guiding protrusions 901 and 901' has a V-shape with an open end (i.e. right end of first guiding protrusion 901 and left end of first guiding protrusion 901' in FIG. 10) facing the second opening 90_O2.

In one aspect, an included angle of the V-shape (e.g., 2θ shown in FIGS. 11A, 11B and 11D) is between 10 degrees and 170 degrees; and a preferable included angle of the V-shape is between 50 degrees and 90 degrees to effectively direct soft materials to two opposite sides in the first direction.

Similarly, the cover 900 further includes two second guiding protrusions 902 and 902', protruded out from the first surface toward the working surface S and respectively arranged at two opposite sides of the second opening 90_O2 in the second direction, and each of the two second guiding protrusions 902 and 902' has a V-shape (e.g., identical to the two first guiding protrusions 901 and 901' as shown in FIGS. 10, 11B and 11D) or an arc shape (e.g., different from the two first guiding protrusions 901 and 901' as shown in FIG. 11A) with an open end (i.e. right end of second guiding protrusion 902 and left end of second guiding protrusion 902' in FIG. 10) facing the second opening 90_O2.

In another aspect, the first branch and the second branch of the first guiding protrusions 901 and 901' respectively form an arc shape such that each of the two first guiding protrusions 901 and 901' has an arc shape with an open end (i.e. right end of first guiding protrusion 901 and left end of first guiding protrusion 901' in FIG. 11C) facing the second opening 90_O2.

Similarly, the cover 900 further includes two second guiding protrusions 902 and 902', protruded out from the first surface toward the working surface S and respectively arranged at two opposite sides of the second opening 90_O2 in the second direction, and each of the two second guiding protrusions 902 and 902' has a V-shape (e.g., different from the two first guiding protrusions 901 and 901') or an arc shape (e.g., identical to the two first guiding protrusions 901 and 901' as shown in FIG. 11C) with an open end (i.e. right end of first guiding protrusion 902 and left end of first guiding protrusion 902' in FIG. 11C) facing the second opening 90_O2. It should be mentioned that the arc-shaped first guiding protrusions 901 and 901' and the arc-shaped second guiding protrusions 902 and 902' are not limited to continuous walls as shown in FIG. 11C, but are formed by multiple individual pillars similar to FIG. 11B.

To improve the guiding efficiency, the top surface of the first guiding protrusions 901 and 901' and the second guiding protrusions 902 and 902' forms a smooth curvature or tilted surface (not vertical angle) to allow the soft materials to pass smoothly. Although the drawings of the present disclosure show that the tilted surfaces of the first guiding protrusions 901 and 901' and the second guiding protrusions 902 and 902' are only at an outer side (a side not facing the second opening 90_O2) thereof, the present disclosure is not limited. In another aspect, the tilted surfaces of the first guiding protrusions 901 and 901' and the second guiding protrusions 902 and 902' are formed at both an inner side (a side facing the second opening 90_O2) and the outer side of the first guiding protrusions 901 and 901' and the second guiding protrusions 902 and 902'.

It should be mentioned that although FIG. 10 shows that the cover 900 is combined to the hood 80 of the second embodiment, the present disclosure is not limited thereto. The cover 900 is also adaptable to be combined to or arranged opposite to the hood 20 shown in FIG. 6.

It should be mentioned that although the drawings of the present disclosure show that the first opening 90_O1 and the second opening 90_O2 are connected to each other, the present disclosure is not limited thereto. It another aspect, the first opening 90_O1 and the second opening 90_O2 are separated two openings.

It should be mentioned that although the drawings of the present disclosure show that the guiding protrusions are mainly surrounding the second opening 90_O2 but surrounding only a part of the first opening 90_O1, the present disclosure is not limited thereto. In other aspects, the guiding protrusions are surrounding both the first opening 90_O1 and the second opening 90_O2 to block soft materials from entering both the first opening 90_O1 and the second opening 90_O2 as much as possible.

It should be mentioned that although the present disclosure is illustrated in the way that the first guiding protrusions 901 and 901' and the second guiding protrusions 902 and 902' are arranged at two opposite sides of the second opening 90_O2, the present disclosure is not limited thereto. In the case that the moving direction is only in one direction, it is possible to arrange a single first guiding protrusion and a single second guiding protrusion at one side of the second opening 90_O2 opposite to the moving direction, i.e. the side that soft materials coming close to the second opening 90_O2.

It should be mentioned that although the drawings of the present disclosure show that the trenches between 901 and 902 and between 901' and 902' have the same height as the first surface of the cover 900 and 900A to 900D, the present disclosure is not limited thereto. In other aspects, the trenches between 901 and 902 and between 901' and 902' have a height lower than the first surface of the cover 900 and 900A to 900D.

As mentioned above, to normally operate on different working surfaces, in addition to enhance the post-processing ability of the processor, utilizing multiple light sources to operate corresponding to different working surfaces is another choice. However, how to avoid the interference between different light sources is an issue to be solved. Accordingly, the present disclosure provides an optical engine for navigation devices and a carrier member thereof (e.g., FIG. 7 to FIG. 9) that light up different light sources when a type of the working surface changes so as to improve the image feature in the image frames. By arranging the passable light wavelengths of the lens and the tilted wall, the optical engine of the present disclosure can eliminate the interference between emitted light and reflected light from different light sources to improve the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A cover, being covered on an optical system, comprising:
   a first surface, configured to face a working surface when the optical system is moving on the working surface;
   a first opening, configured to let emission light go through;
   a second opening, arranged adjacent to the first opening in a first direction and connected to the first opening, and configured to let reflected light from the working surface go through; and
   two first guiding protrusions, protruded out from the first surface toward the working surface and respectively arranged at two opposite sides of the second opening in a second direction,
   wherein each of the two first guiding protrusions has
      a first branch extending toward the first opening, wherein an end of the first branch extends to an edge of the first opening, and
      a second branch extending away from the first opening, and
   wherein a distance between the first branch and the second branch becomes larger from a connection point of the first branch and the second branch.

2. The cover as claimed in claim 1, wherein the first branch and the second branch respectively comprise a continuous straight wall.

3. The cover as claimed in claim 1, wherein the first branch and the second branch respectively comprise multiple individual pillars.

4. The cover as claimed in claim 1, wherein the first branch and the second branch respectively comprise a continuous curved wall.

5. The cover as claimed in claim 1, furthering comprising two second guiding protrusions, protruded out from the first surface toward the working surface and respectively arranged at the two opposite sides of the second opening in the second direction, wherein the two second guiding protrusions are closer to the second opening than the two first guiding protrusions.

6. The cover as claimed in claim 5, wherein the two second guiding protrusions have the same shape as that of the two first guiding protrusions.

7. The cover as claimed in claim 5, wherein the two second guiding protrusions have a different shape from that of the two first guiding protrusions.

8. The cover as claimed in claim 5, wherein the two second guiding protrusions have the same height as that of the two first guiding protrusions.

9. The cover as claimed in claim 5, wherein the two second guiding protrusions have a different height from that of the two first guiding protrusions.

10. A cover, being covered on an optical system, comprising:
    a first surface, configured to face a working surface when the optical system is moving on the working surface;
    a first opening, configured to let emission light go through;
    a second opening, arranged adjacent to the first opening in a first direction, and configured to let reflected light from the working surface go through;
    two first guiding protrusions, protruded out from the first surface toward the working surface and respectively arranged at two opposite sides of the second opening in a second direction, wherein each of the two first guiding protrusions has a V-shape with an open end facing the second opening; and
    two second guiding protrusions, protruded out from the first surface toward the working surface and respectively arranged at the two opposite sides of the second opening in the second direction, wherein the two second guiding protrusions are closer to the second opening than the two first guiding protrusions.

11. The cover as claimed in claim 10, wherein an included angle of the V-shape is between 10 degrees and 170 degrees.

12. The cover as claimed in claim 10, wherein the two first guiding protrusions respectively comprise two continuous straight walls.

13. The cover as claimed in claim 10, wherein the two first guiding protrusions respectively comprise multiple individual pillars.

14. The cover as claimed in claim 10, wherein
    each of the two second guiding protrusions has a V-shape or an arc shape with an open end facing the second opening.

15. The cover as claimed in claim 14, wherein the two second guiding protrusions are higher than the two first guiding protrusions.

16. A cover, being covered on an optical system, comprising:
    a first surface, configured to face a working surface when the optical system is moving on the working surface;
    a first opening, configured to let emission light go through;
    a second opening, arranged adjacent to the first opening in a first direction, and configured to let reflected light from the working surface go through;
    two first guiding protrusions, protruded out from the first surface toward the working surface and respectively arranged at two opposite sides of the second opening in a second direction, wherein each of the two first guiding protrusions has an arc shape with an open end facing the second opening; and
    two second guiding protrusions, protruded out from the first surface toward the working surface and respectively arranged at the two opposite sides of the second opening in the second direction, wherein the two second guiding protrusions are closer to the second opening than the two first guiding protrusions.

17. The cover as claimed in claim 16, wherein the two first guiding protrusions respectively comprise a continuous wall.

18. The cover as claimed in claim 16, wherein the two first guiding protrusions respectively comprise multiple individual pillars.

19. The cover as claimed in claim 16, wherein
each of the two second guiding protrusions has a V-shape or an arc shape with an open end facing the second opening.

* * * * *